US010553330B2

United States Patent
Uchiyama et al.

(10) Patent No.: US 10,553,330 B2
(45) Date of Patent: Feb. 4, 2020

(54) IN-WHEEL MOTOR POWER CABLE, AND WIRING STRUCTURE AND SELECTION METHOD THEREFOR (71) Applicant: NTN CORPORATION, Osaka (JP)

(72) Inventors: Naoyuki Uchiyama, Iwata (JP); Akio Nakajima, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 16/383,077

(22) Filed: Apr. 12, 2019

(65) Prior Publication Data

US 2019/0237216 A1 Aug. 1, 2019

Related U.S. Application Data (63) Continuation of application No. PCT/JP2016/083140, filed on Nov. 8, 2016.

(30) Foreign Application Priority Data

Oct. 18, 2016 (JP) .................................. 2016-204298

(51) Int. Cl.
*H01B 7/04* (2006.01)
*H01B 7/00* (2006.01)
(Continued)

(52) U.S. Cl.
CPC ............ *H01B 7/04* (2013.01); *B60K 7/0007* (2013.01); *H01B 3/445* (2013.01); *H01B 7/0009* (2013.01); *H01B 7/17* (2013.01)

(58) Field of Classification Search
CPC ........... H01B 7/04; H01B 7/041; H01B 3/445
See application file for complete search history.

(56) References Cited

U.S. PATENT DOCUMENTS 10,150,359 B2 12/2018 Tamura
2008/0097048 A1* 4/2008 Ono .................... C08L 27/18
525/539
(Continued)

FOREIGN PATENT DOCUMENTS

CN 104376901 2/2015
JP 3-25805 2/1991
(Continued)

OTHER PUBLICATIONS

English Translation by WIPO of the International Preliminary Report on Patentability dated May 2, 2019 in corresponding International Patent Application No. PCT/JP2016/083140 (5 pages).
(Continued)

*Primary Examiner* — Hoa C Nguyen
*Assistant Examiner* — Amol H Patel (57) ABSTRACT

Provided is an in-wheel motor power cable in which a cross-sectional area of a conductor portion can be sufficiently assured for allowing large current to pass therethrough while avoiding excessively large maximum diameter of the cable. The power cable includes a conductor portion; an insulator configured to cover an outer circumference of the conductor portion; a hollow shield wire configured to cover an outer circumference of the insulator; and a sheath configured to cover an outer circumference of the shield wire. The conductor portion comprises a composite strand obtained by stranding a plurality of wire strands each of which is a strand of a plurality of filaments with no insulating layer, each filament being a tin-plated soft copper wire. The insulator is a soft fluororesin, and the shield wire is a braided copper-foiled yarn cable.

9 Claims, 5 Drawing Sheets (51) Int. Cl.
    *H01B 7/17*    (2006.01)
    *H01B 3/44*    (2006.01)
    *B60K 7/00*    (2006.01)

(56) References Cited

U.S. PATENT DOCUMENTS

| | | | | |
|---|---|---|---|---|
| 2009/0166111 | A1* | 7/2009 | Mizutani | B60K 7/0007 |
| | | | | 180/65.51 |
| 2011/0005805 | A1* | 1/2011 | Eshima | H01B 7/0009 |
| | | | | 174/114 R |
| 2016/0293292 | A1 | 10/2016 | Oshima et al. | |
| 2016/0358689 | A1* | 12/2016 | Huang | H01B 1/22 |
| 2016/0361989 | A1 | 12/2016 | Tamura | |
| 2019/0031795 | A1* | 1/2019 | Nonaka | C08F 16/24 |

FOREIGN PATENT DOCUMENTS

| | | |
|---|---|---|
| JP | 2006-96968 | 4/2006 |
| JP | 2007-305479 | 11/2007 |
| JP | 2011-18545 | 1/2011 |
| JP | 4984626 | 5/2012 |
| JP | 2015-49998 | 3/2015 |
| JP | 2015-160498 | 9/2015 |
| JP | 2015-187956 | 10/2015 |
| JP | 2016-19306 | 2/2016 |

OTHER PUBLICATIONS

Japanese Decision of Grant issued Feb. 14, 2017 in corresponding Japanese Application No. 2016-204298.
Japanese Notification of Reasons for Cancellation issued Dec. 12, 2017 on Corresponding Japanese Opposition No. 2017-700968.
Wire and Cable Handbook, 5$^{th}$ Corrected Version, Hitachi Cable, Ltd., Sankaido, May 15, 1990, p. 32-33.
Japanese Decision of Opposition Division issued Mar. 29, 2018 on corresponding Japanese Opposition No. 2017-700968.
Japanese Trial & Appeal decision issued Jun. 29, 2018 in corresponding Japanese Publication No. 2017-700968.
International Search Report dated Dec. 13, 2016 in corresponding International Application No. PCT/JP2016/083140.

* cited by examiner

IN-WHEEL MOTOR POWER CABLE, AND WIRING STRUCTURE AND SELECTION METHOD THEREFOR

CROSS REFERENCE TO THE RELATED APPLICATION

This application is a continuation application, under 35 U.S.C. § 111(a), of international application No. PCT/JP2016/083140, filed Nov. 8, 2016, which claims Convention priority to Japanese patent application No. 2016-204298, filed Oct. 18, 2016, the entire disclosure of which is herein incorporated by reference as a part of this application.

BACKGROUND OF THE INVENTION

Field of the Invention

The present invention relates to an in-wheel motor power cable used as a power cable of an in-wheel motor, a wiring structure for an in-wheel motor power cable, and a method of selecting an in-wheel motor power cable.

Description of Related Art

The following constructions have been proposed for electric cables used in a section to which vibration of an automobile and/or bending are frequently applied.

Figure 8:
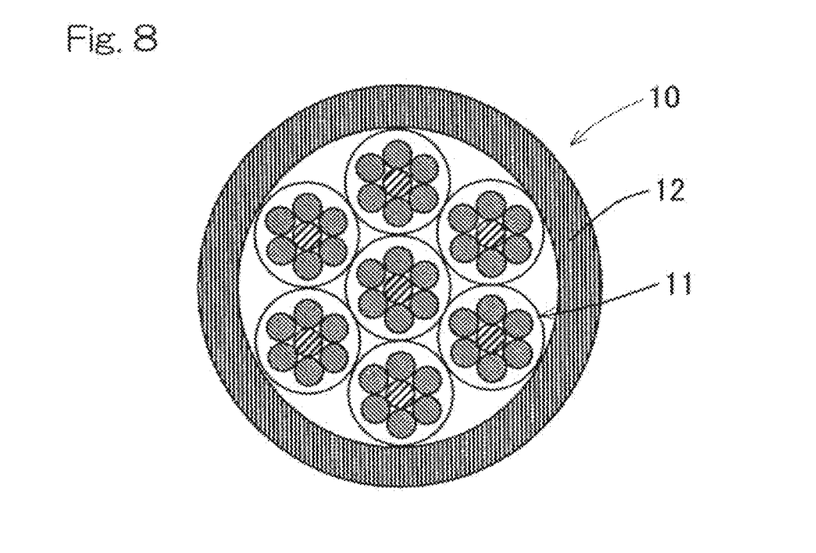
FIG. 8 is a cross-sectional view of an example of a conventional power cable.

For example, Patent Document 1 proposed an electric cable of enhanced mechanical strength and flexibility by a construction as shown in FIG. 8. In this case, an electric cable 10 is constituted of a strand of a plurality of electric wires 11 covered by a sheath 12, where each of the electric wires 11 is constituted by stranding (twisting) a plurality of conductor wires around a high tensile strength wire, and forming an insulating layer around the stranded conductor wires.

Figure 9:
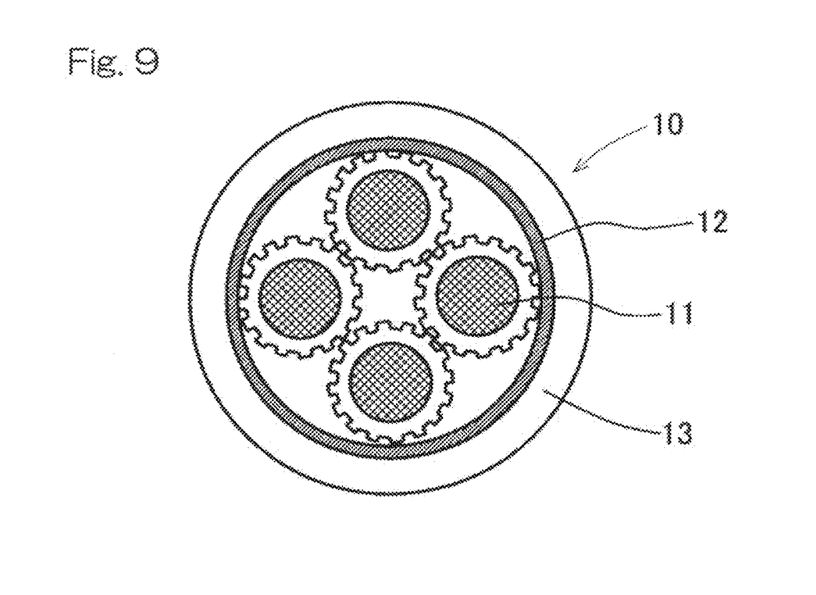
FIG. 9 is a cross-sectional view of another example of a conventional power cable.

Patent Document 2 proposed an electric cable as shown in FIG. 9. In this case, the electric cable includes a plurality of electric wires 11 each having a conductor and an insulating layer, a holding member 12, and a sheath 13 that covers an outer circumference of the holding member 12, where grooves are formed in the surface of the insulating layer along the longitudinal direction of the electric wire, and the plurality of electric wires move relative to each other in the time of bending the electric cable.

RELATED DOCUMENT

Patent Document

Patent Document 1: JP Laid-open Patent Publication No. 2007-305479
Patent Document 2: JP Patent No. 4984626

SUMMARY OF THE INVENTION

Both Patent Documents 1 and 2 propose a structure in which the electric wires having the insulating layers are stranded inside the sheath. In such structures, the cable may have a large outermost diameter since the sheath further encloses the insulating layers inside thereof. The following problem may arise where the electric cable disclosed in Patent Document 1 or 2 is used as a power cable of an in-wheel motor.

A power cable used for an in-wheel motor must have a sufficient cross-sectional area of a conductor portion so as to allow large electric current to pass therethrough. Where a plurality of conductors are covered by insulating layers as disclosed in Patent Document 1 and 2, a small minimum bending radius may not be sufficiently assured due to the above-described enlarged outermost diameter of the cable. In the cable proposed in Patent Document 1, each of the stranded wires has a tensile wire of high tensile strength. In the cable proposed in Patent Document 2, the insulating layers are provided with grooves. Both of these cases require specific processing during the production process of the cable, which may result in expensive cost for cables.

An object of the present invention is to provide an in-wheel motor power cable, a wiring structure for the in-wheel motor power cable, and a selection method for the in-wheel motor power cable, wherein the power cable has a sufficient cross-sectional area of a conductor portion for allowing large current to pass therethrough while avoiding excessively large maximum diameter, avoids failure such as breakage of the cable for a long term operation even under frequently bent conditions, and can be obtained at low cost while avoiding special processing.

An in-wheel motor power cable according to one constitution of the present invention is a power cable through which power is supplied to an in-wheel motor, and includes: a conductor portion; an insulator configured to cover (surrounds) an outer circumference of the conductor portion; a hollow shield wire (tubular shield wire) configured to cover an outer circumference of the insulator; and a sheath configured to cover an outer circumference of the shield wire, wherein the conductor portion includes a composite strand that is a strand of a plurality of insulating-layer-free wire strands each of which is a strand of a plurality of filaments, the filaments are tin-plated soft copper (annealed copper) wires, the insulator is a soft fluorinated resin, and the shield wire is a braided copper-foiled yarn cable.

In this configuration, even though the conductor portion is a composite strand, it is possible to avoid large maximum diameter of the cable since the wire strands used in the conductor portion do not include insulating layers. Further, since the conductor portion includes a composite strand that is a strand of a plurality of insulating-layer-free wire strands each of which is a strand of a plurality of filaments, the cable can be bent more easily than a cable constituted of filaments with insulating layers. As a result, it is possible to ensure sufficiently small minimum bending radius while ensuring sufficient cross-sectional area of the conductor portion that allows large current required for a power cable used in an in-wheel motor to pass therethrough. Moreover, also because the filament is a tin-plated soft copper wire, the insulator is a soft fluororesin, and the shield wire is a braided copper-foiled yarn cable (braid cable made of copper-foiled yarns), the power cable has excellent bending resistance (resistance to bending). Therefore, the power cable is appropriate as an in-wheel motor power cable which is frequently subjected to vibration and bending. Since the in-wheel motor is required to generate large driving torque, large current passes through the cable. However, generation of radiation noise from the power cable (which is concerned in the case of passing large current through a power cable) is prevented by the shield wire disposed outside the conductor portion.

Regarding a combination of a material and a structure of the conductor portion, it has been confirmed through a bending test that the above described material and the structure of the conductor portion and the material of the insulator provide excellent bending resistance.

In the above-described in-wheel motor power cable, the conductor portion may have, at a center thereof, a tensile member or tensile force bearer which bears a tensile force that acts on the power cable. The tensile member is preferably made of flexible material having high tensile strength, for example, KEVLAR™ or the like. The in-wheel motor power cable is expected to be used in a condition in which tensile stress is applied to the conductor portion. Even under such operation condition, presence of the tensile member prevents breakage of the power cable due to the tensile force.

In the in-wheel motor power cable, the composite strand may be a double layered composite strand. In this case, a part of the wire strands is stranded (twisted) to form an inner composite strand, and the other part of the wire strands is stranded to form an outer composite strand that is disposed around the outer circumference of the inner composite strand. Where the conductor portion is a double layered composite strand, the cable has further excellent bending resistance.

In the above-described in-wheel motor power cable, the sheath may be a soft fluororesin or polyester elastomer. Since the soft fluororesin or polyester elastomer has excellent flexibility, use of these materials for the sheath provides a power cable of further excellent bending resistance and twisting resistance.

A wiring structure for an in-wheel motor power cable according to another constitution of the present invention includes:

an in-wheel motor driving unit that is disposed in a wheel to drive the wheel;

a suspension unit that connects the in-wheel motor driving unit to a vehicle body in a manner capable of absorbing vertical vibration; and a bendable power cable one end of which is connected to a power wire connection portion disposed in the in-wheel motor driving unit, and the other end of which extends to the vehicle body to supply power from the vehicle body to the in-wheel motor driving unit, wherein the power cable is an in-wheel motor power cable having the above-described configuration.

In the wiring structure, a power cable is frequently subjected to bending due to vertical vibration during running of a vehicle. As explained above, the in-wheel motor power cable of the above-described configuration can have a sufficient cross sectional area of a conductor portion to allow large current to pass therethrough while avoiding excessively large maximum diameter. Therefore, according to the above-described wiring structure, it is possible to avoid failure such as breakage of a cable in a long term operation even when bending is frequently applied. In addition, it is possible to obtain the wiring structure at low cost while avoiding a special processing during the production process.

In the wiring structure for an in-wheel motor power cable, the suspension unit may have a configuration such that the in-wheel motor driving unit is connected to the vehicle body in steerable (turnable) manner about a steering axis extending in an vertical (up-down) direction. In the in-wheel motor driving unit that is connected to the vehicle body via the suspension unit for steering, degree of bending that acts on the power cable is increased, and the influence of bending is added to the influence of vertical vibration. Even under such harsh operation conditions, it is possible to avoid failure such as breakage of a cable by the use of the in-wheel motor power cable of the above-described configuration.

A selection method of an in-wheel motor power cable according to still another constitution of the present invention is a method of selecting an electric cable to be used as an in-wheel motor power cable, the method comprising selecting a power cable that is designed to satisfy all of the following requirements:

the power cable includes a conductor portion, an insulator configured to cover (surrounds) an outer circumference of the conductor portion, a hollow shield wire configured to cover an outer circumference of the insulator, and a sheath configured to cover an outer circumference of the shield;

the conductor portion includes a composite strand that is a strand of a plurality of insulating-layer-free wire strands each of which is a strand of a plurality of filaments;

each of the filaments is an tin-plated soft copper wire;

the insulator is a soft fluororesin; and the shield wire is a braided copper-foiled yarn cable.

As it is understood from the above-described explanation for the in-wheel motor power cable of the present invention, a power cable selected to satisfy the above-described requirements can have a sufficient cross sectional area of a conductor portion to allow large current to pass therethrough while avoiding excessively large maximum diameter. Therefore, it is possible to avoid failure such as breakage of a cable in a long term operation even when bending is frequently applied. In addition, such a power cable can be obtained at low cost while avoiding a special processing during the production process. Further, by the above-described criteria for selection, it is possible to clarify a specific configuration of a power cable appropriate for an in-wheel motor.

The "designed electric cable" may be a robot cable. Among various robot cables having various specifications, limited robot cables have optimal specifications to be used in the in-wheel motor. By selecting a power cable that satisfies the above-described requirements, a robot cable having appropriate specification for the in-wheel motor is selected.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A first embodiment of the present invention will be described with reference to the drawings. As shown in a cross-sectional view of FIG. 1, a power cable 1 of an in-wheel motor includes a conductor portion 2, an insulator 3 configured to cover the outer circumference of the conductor portion 2, a hollow shield wire 4 configured to cover the outer circumference of the insulator 3, and a sheath 5 configured to cover the outer circumference of the shield wire 4, so as to be arranged in order, respectively, from the center portion.

Figure 2:
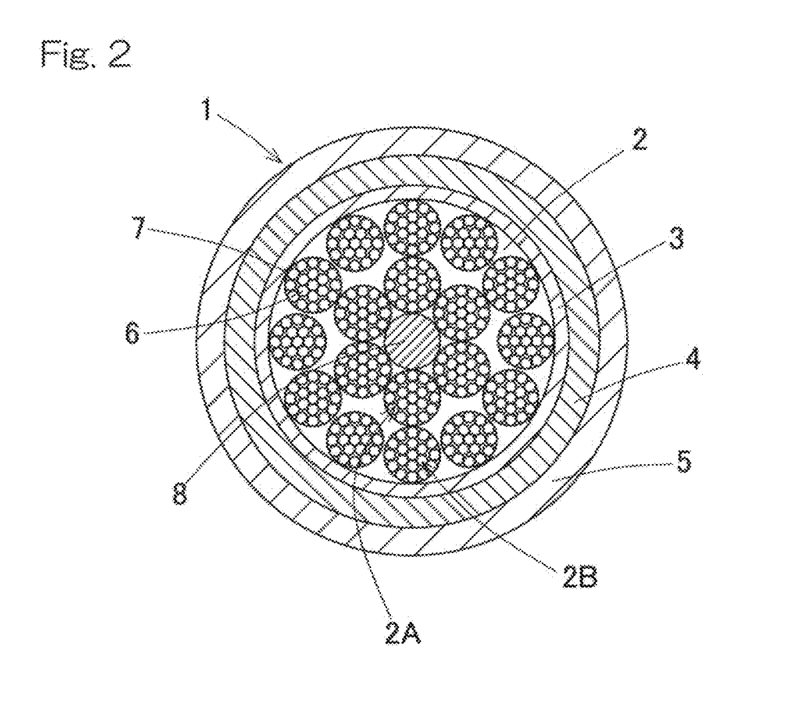
FIG. 2 is a cross-sectional view of a specific example of the in-wheel motor power cable shown in FIG. 1.

As shown in FIG. 2, the conductor portion 2 is a composite strand obtained by stranding a plurality of wire strands 7 each of which is a strand of a plurality of filaments 6 having no insulating layer. The filament 6 is a tin-plated soft copper wire. The insulator 3 is a soft fluororesin having excellent flexibility. The shield wire 4 is a braided copper-foiled yarn cable having excellent flexibility, pliability, and light weight. The sheath 5 is composed of a soft fluororesin or polyester elastomer.

A tensile member (tensile wire) 8 that bears tensile force acting on the power cable 1 is disposed at the center of the conductor portion 2. The tensile member 8 is preferably made of flexible material having high tensile strength, for example, KEVLAR (registered trademark) or the like.

More specifically, the composite strand that constitutes the conductor portion 2 is a composite strand having a double layered structure including an inner composite strand 2A and outer composite strand 2B, where the wire strands 7 are stranded in the inner composite strand 2A so as to form circular arrangement around the outer circumference of the tensile member 8; and the wire strands 7 are stranded in the outer composite strand 2B so as to form circular arrangement around the outer circumference of the inner composite strand 2A.

In the power cable 1 having the above-described configuration, since the wire strands 7 having no insulating layer is used in the conductor portion 2, it is possible to avoid excessively large maximum diameter of the cable while using a composite strand. Therefore, also because the conductor portion 2 is formed from the composite strand obtained by stranding the plurality of wire strands 7 each of which is a strand of a plurality of filaments 6, the power cable is bent more easily than the case of using wire strands 7 having insulating layer. As a result, it is possible to assure small minimum bending radius while assuring a sufficient cross-sectional area of the conductor portion in order to allow large current required for a power cable used in an in-wheel motor to pass therethrought. Where the conductor portion 2 is a composite strand having a double layered structure as illustrated in the drawings, bending resistance is more excellent.

Further, the power cable has excellent bending resistance also because the filament 6 is a tin-plated soft copper wire, the insulator 3 is a soft fluororesin, and the shield wire 4 is a braided copper-foiled yarn cable. The material of the sheath 5 is a soft fluororesin or polyester elastomer. Since the soft fluororesin and the polyester elastomer have excellent flexibility, the power cable 1 has excellent bending resistance and twisting resistance by the use of these materials in the sheath 5.

Since the in-wheel motor is required to generate large driving torque, large current passes through the power cable 1. However, generation of radiation noise from the power cable 1 (which is concerned in the case of passing large current through a power cable) is prevented since the shield wire 4 is disposed outside the conductor portion 2.

The in-wheel motor power cable 1 is expected to be used in a condition in which tensile stress is applied to the conductor portion 2. Even under such operation condition, presence of the tensile member 8 such as KEVLER (registered trademark) prevents breakage of the power cable due to the tensile force.

These effects were confirmed also by the following test.

Next, a test performed for evaluating applicability of a power cable to an in-wheel motor will be described.

Figure 6:
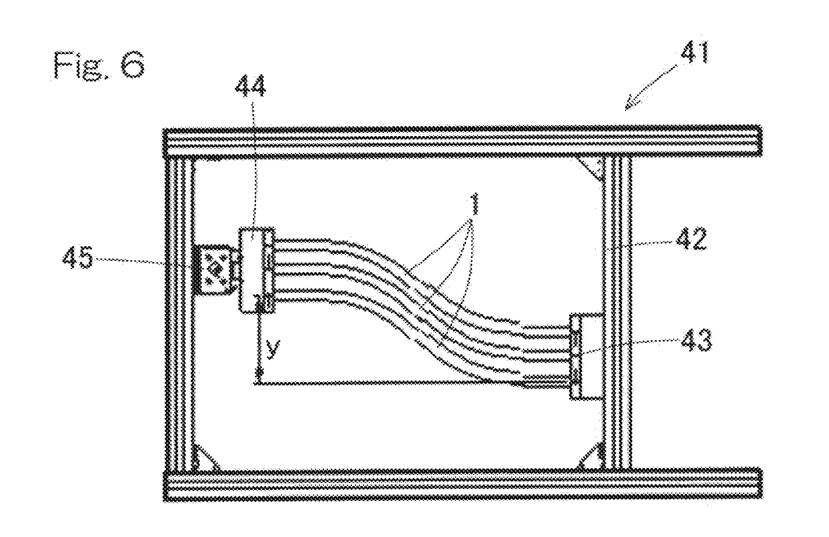
FIG. 6 is a plan view of a bending test machine.
Figure 7:
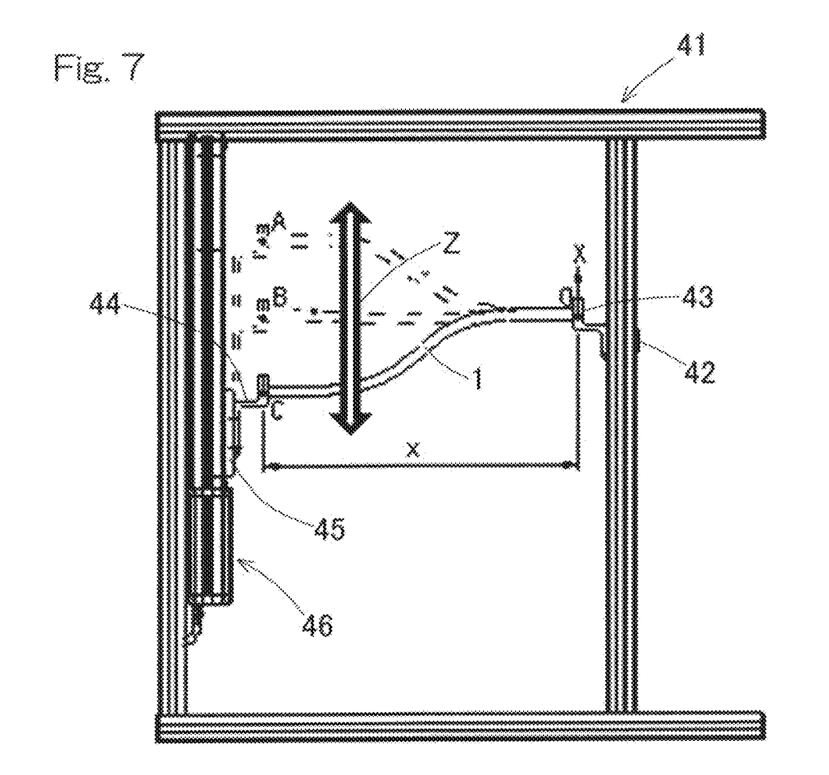
FIG. 7 is a front view of the bending test machine.

A schematic construction of a test machine and an outline of the test will be described with reference to FIG. 6 and FIG. 7. FIG. 6 is a plan view of a cable bending test machine and FIG. 7 is a side view thereof. A fixed cable attachment 43 is mounted to a horizontal bar 42 disposed to the right side of a test machine frame 41. A slider 45 is disposed to the left side of the test machine frame 41 so as to be movable in the vertical direction. A movable cable attachment 44 is fixed to the slider 45. The slider 45 is moved reciprocally upward and downward by a vertical driving unit 46, and the movable cable attachment 44 moves in the movement direction Z upward and downward between positions A and C about a center position set at a position B. The vertical driving unit 46 includes an electric motor and a linear motion mechanism or a fluid pressure cylinder unit or the like.

Both ends of the power cable 1 to be tested are fixed to both the cable attachments 43 and 44, respectively. A horizontal distance x in the right-left direction between the fixing position at the fixed cable attachment 43 and a fixing position on the movable is 350 mm, and a horizontal distance y as a front-rear offset amount is 100 mm.

Where a coordinate of the slider 45 is set at zero when a fixing position of the power cable 1 at the fixed cable attachment 43 and a fixing position of the power cable 1 at the movable cable attachment 44 are at the same height, the slider 45 moves by a stroke of about ±80 mm. The slider is moved by an operation frequency of 2 Hz, and the power cable is evaluated after bending of one million times. In this test, respective (three) power cables 1 of a three-phase cable for motor driving are tested simultaneously, and damage to each of the power cables 1 is examined to evaluate its quality.

The criteria are as follows.

(a) The evaluation is "acceptable" where all the filaments in the center conductor and the shield wire are not broken.

(b) The evaluation is "applicable (there is a place of applicability)" where both of the center conductor and the shield wire show breakage of filaments, but the breakage rate for each of the center conductor and the shield wire is not greater than 10%.

(c) The evaluation is "not acceptable" where at least one of the center conductor and the shield wire show breakage of filaments with breakage rate of not less than 10%.

For the power cables 1 of examples 1 to 2 and comparative examples 1 to 5 for which the test was performed, specifications and the test result of each of the power cables 1 are summarized in Table 1.

As indicated in this table, the results were "acceptable" for Examples 1 and 2, "applicable" for Comparative Examples 1, 3, and 4, and "not acceptable" for Comparative Examples 2 and 5.

for selecting an electric cable used as an in-wheel motor power cable from electric cables is a method for selecting a cable that is designed to satisfy all the requirements described below in the present embodiment.

(a) The power cable includes a conductor portion 2, an insulator 3 configured to cover an outer circumference of the conductor portion 2, a hollow shield wire configured

TABLE 1

| | | Example 1 | Example 2 | Comp. Ex. 1 | Comp. Ex. 2 | Comp. Ex. 3 | Comp. Ex. 4 | Comp. Ex. 5 |
|---|---|---|---|---|---|---|---|---|
| Conductor portion | Filament material | tin-plated soft copper wire | tin-plated soft copper wire | tin-plated copper alloy wire | anealed copper wire | copper alloy wire | tin-plated anealed copper wire | tin-plated anealed copper wire |
| | Conductor wire structure | composite strand (double) | composite strand (double) | composite strand | composite strand | composite strand | composite strand (double) | composite strand |
| | Center member | Non | KEVLAR (registered trademark) | Non | Non | Non | Non | Non |
| Insulator | Material | soft fluororesin | soft fluororesin | fluorine-based resin | crosslinked polyethylene | crosslinked polyethylene | silicone rubber | silicone rubber |
| Shield wire | Material | Braid of copper-foiled yarn | Braid of copper-foiled yarn | tin-plated copper alloy wire | tin-plated anealed copper wire | copper alloy wire | braid of tin-plated anealed copper wire | braid of tin-plated anealed copper wire |
| Sheath | Material | soft fluororesin | polyester elastomer | thermoplastic polyurethane | crosslinked polyethylene | crosslinked polyethylene | thermoplastic polyurethane | thermoplastic polyurethane |
| Simple bending test | | acceptable | acceptable | may be applicable | not acceptable | may be applicable | may be applicable | not acceptable |

The above-described results indicate that a power cable according to mode 1 that includes the following combination of (a) to (d) is appropriate in order to meet the requirements for the in-wheel motor power cable. Furthermore, it is indicated that the following modes 2 to 4 are more appropriate.

Mode 1:

(a) The material of wires in the conductor portion is preferably a tin-plated soft copper wire.

(b) The conductor portion is preferably structured as a composite strand obtained by stranding a plurality of wire strands each of which is a strand of filaments.

(c) The insulator configured to cover the conductor portion is preferably a soft fluororesin having excellent flexibility.

(d) The shield wire is preferably a braid cable made of copper-foiled yarns (obtained by winding a copper foil around a core yarns) that has excellent flexibility, pliability, and light weight.

Mode 2: In a case where the electric cable according to mode 1 is assumed to be used in such a condition that tensile stress is applied to the conductor portion, a material (in Table 1, referred to as "center member") such as KEVLAR (registered trademark) having high tensile strength is more preferably disposed at the center of the conductor portion.

Mode 3: In the cable according to mode 1 or mode 2, the conductor portion is more preferably structured as a double layered composite strand as shown in FIG. 2 that includes the inner-side composite strand 2A and the outer-side composite strand 2B constituting an outer layer, where each of the inner-side composite strand 2A and the outer-side composite strand 2B is a strand of a plurality of wire strands 7 each of which is a strand of a plurality of filaments 6.

Mode 4: The sheath is more preferably a soft fluororesin, polyester elastomer, or the like having excellent flexibility so as to ensure bending resistance, twisting resistance, and the like.

Based on the test results described above, a selection method for an in-wheel motor power cable, that is, a method to cover an outer circumference of the insulator 3, and a sheath 5 configured to cover an outer circumference of the shield.

(b) The conductor portion 2 includes a composite strand that is a strand of a plurality of insulating-layer-free wire strands 7 each of which is a strand of a plurality of filaments 6;

(c) Each of the filaments 6 is a tin-plated soft copper wire;

(d) The insulator 3 is a soft fluororesin; and the shield wire 4 is a braided copper-foiled yarn cable.

When the in-wheel motor power cable that satisfies these requirements (a) to (d) is selected, that is, when the above-described selection method is used, it is possible to obtain a power cable having a sufficient cross sectional area of a conductor portion to allow large current to pass therethrough while avoiding excessively large maximum diameter. Therefore, it is possible to avoid failure such as breakage of a cable in a long term operation even when bending is frequently applied. In addition, such a power cable can be obtained at low cost while avoiding a special processing during the production process. Further, by the above-described criteria for selection, it is possible to clarify a specific configuration of a power cable appropriate for an in-wheel motor.

Figure 1:
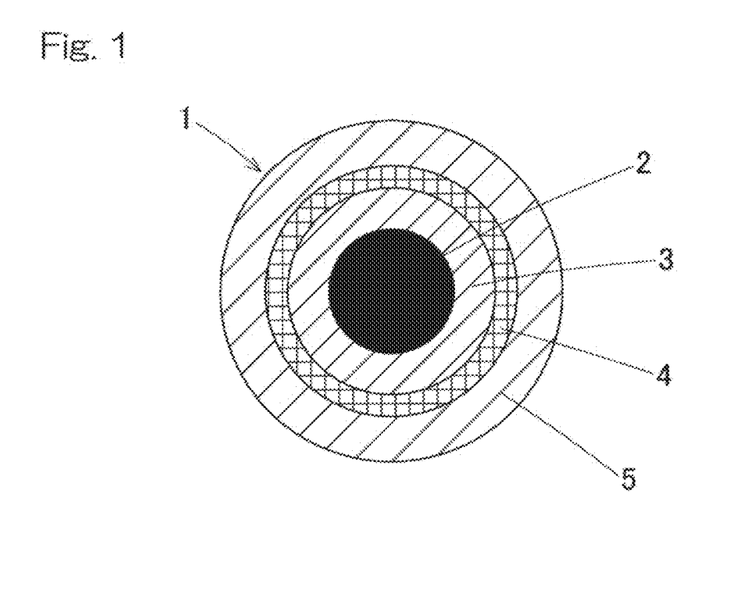
FIG. 1 is a cross-sectional view of a conceptual structure for an in-wheel motor power cable according to one embodiment of the present invention.
Figure 3:
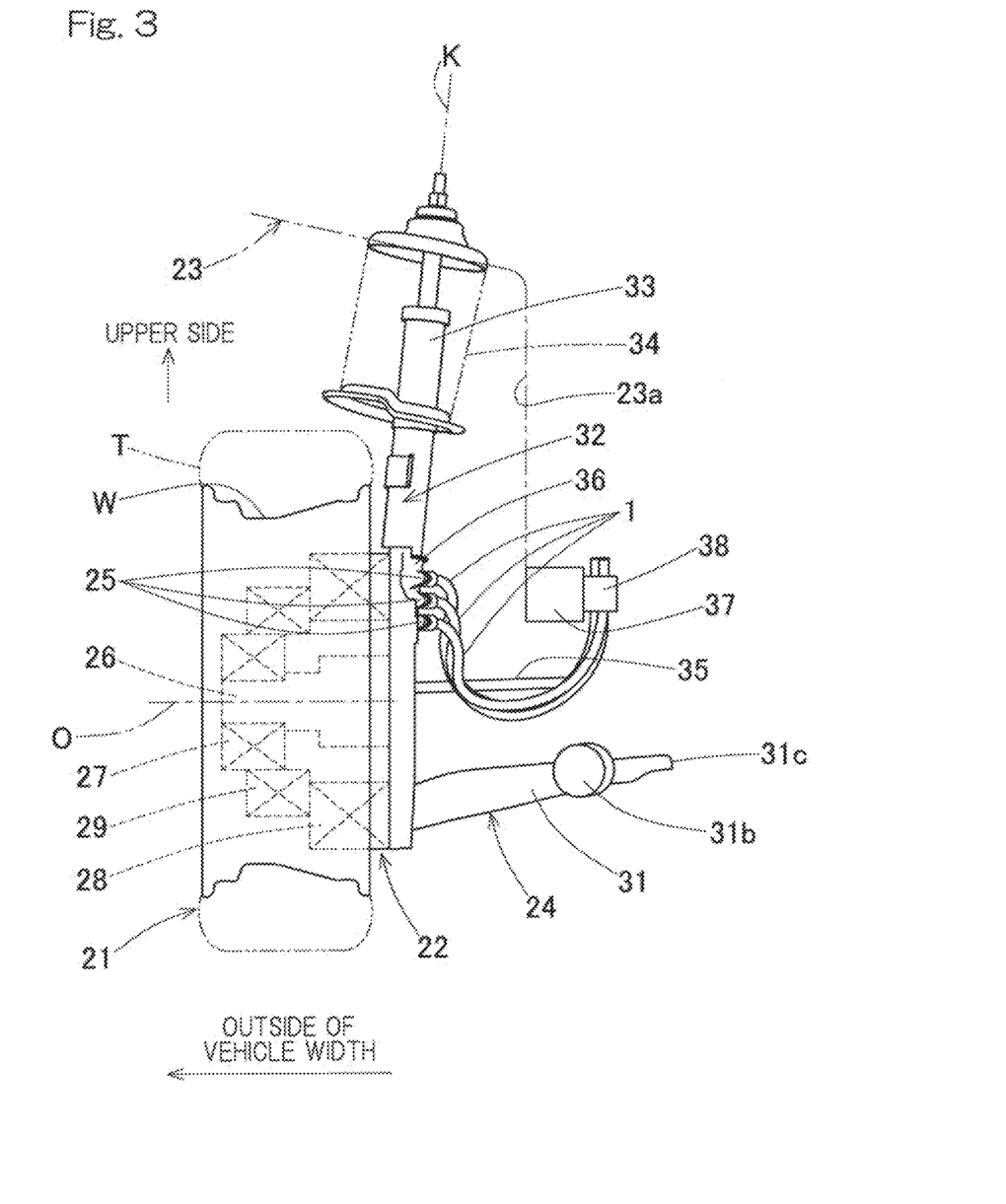
FIG. 3 is a side view of a wiring structure for an in-wheel motor power cable as viewed from the front side of a vehicle, where the in-wheel motor power cable shown in FIG. 1 is used.
Figure 4:
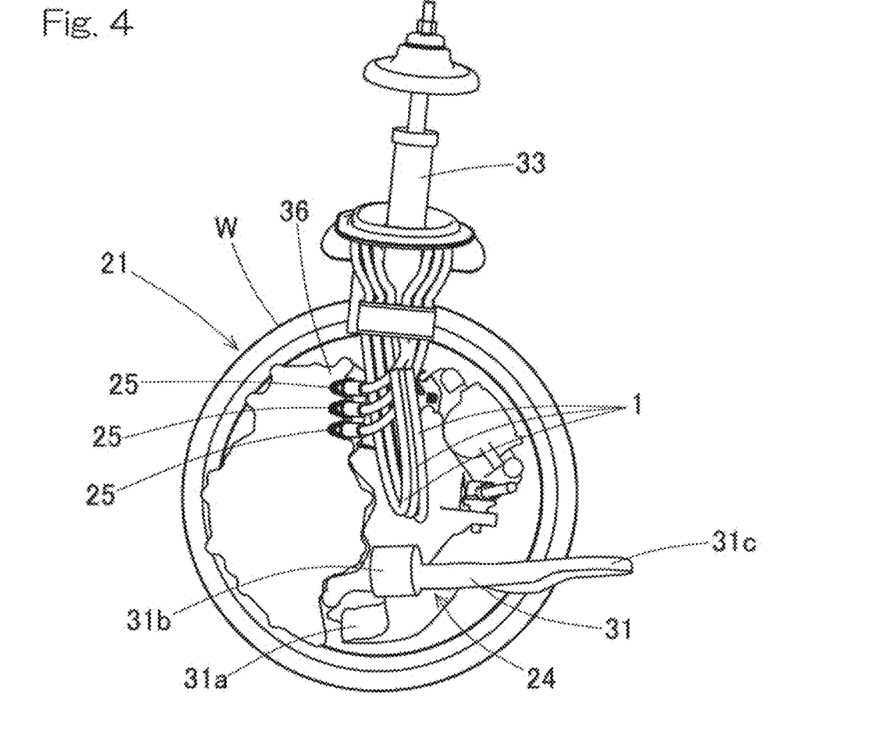
FIG. 4 is a front view of the wiring structure for the in-wheel motor power cable shown in FIG. 1 as viewed from the inner side in the transverse direction of a vehicle.
Figure 5:
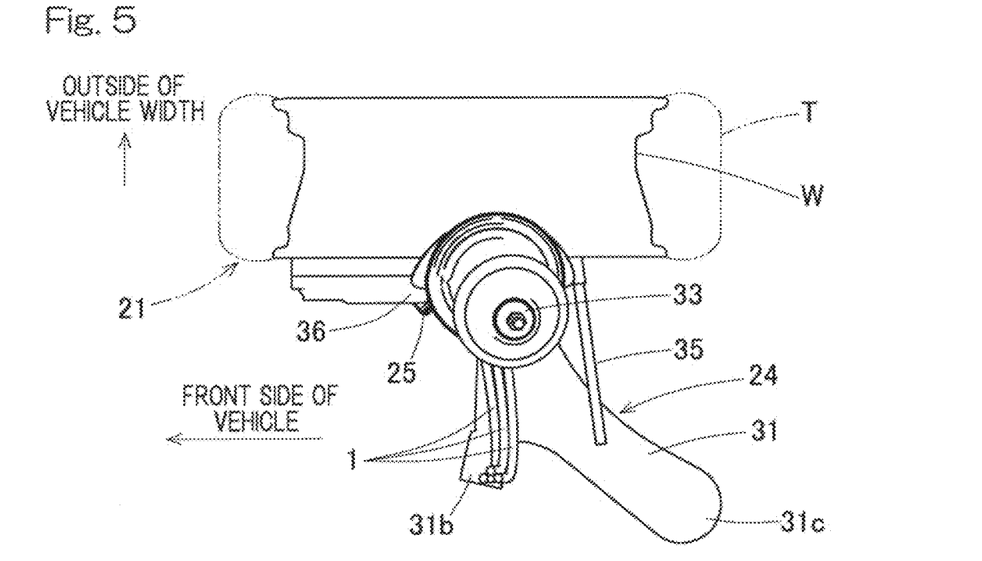
FIG. 5 is a plan view of the wiring structure for the in-wheel motor power cable shown in FIG. 1.

Next, an example of a wiring structure for an in-wheel power cable in which the power cable 1 according to the embodiments shown in FIG. 1 and FIG. 2 is used will be described with reference to FIG. 3 to FIG. 5. A wiring structure for an in-wheel motor power cable includes: an in-wheel motor driving unit 22 that is disposed in a wheel 21 (tire wheel assembly) and drives the wheel 21; and a suspension unit 24 that connects the in-wheel motor driving unit 22 to a vehicle body 23 in a manner capable of steering the in-wheel motor driving unit 22 about a steering axis extending in an vertical direction and capable of absorbing vertical vibration. This wiring structure further includes three bendable power cables 1 one end of each of which is connected to a power wire connection portion 25 disposed in the in-wheel motor driving unit 22, and the other end of each of which extends to the vehicle body 23 to supply power from the vehicle body 23 to the in-wheel motor driving unit 22. These power cables are the in-wheel motor power cables 1 according to the above-described embodiment described with reference to FIG. 1 or FIG. 2. Although the steering axis K fundamentally extends in the vertical direction, the steering axis K may be slightly tilted toward the transverse direction (width direction) and/or the longitudinal direction (front-rear direction) of a vehicle.

The in-wheel motor driving unit 22 is formed by integrally assembling: a wheel bearing 27 that supports the wheel assembly 21 with respect to an axle 26 such that the wheel assembly 21 is rotatable; an electric motor 28; and a reducer 29 that reduces a speed of rotation of the electric motor 28 and transmits the rotation to a rotating ring (not shown) of the wheel bearing 27. In this example, the axle 26 is a fixed shaft, and the rotating ring of the wheel bearing 27 is an outer ring. A wheel W of the wheel assembly 21 is mounted to the outer ring. The wheel assembly 21 includes the wheel W and a tire T. The electric motor 28 is a three-phase AC motor such as a synchronous motor or an induction motor.

The suspension unit 24 is a strut-type suspension unit, and includes a lower arm 31 that extends in the transverse direction of a vehicle (hereafter, referred to as transverse direction), and a strut 32 that is disposed upper than the lower arm 31 and extends in the up-down direction. In the transverse direction, the strut 32 is disposed inward compared to the wheel assembly 21 and the in-wheel motor driving unit 22. The lower end of the strut 32 is joined to the in-wheel motor driving unit 22 and the upper end of the strut 32 is connected to the vehicle body 23 in a portion upper than the wheel assembly 21. The upper portion of the wheel assembly 21 and the upper portion of the in-wheel motor driving unit 22 are housed in a wheel housing 23a formed on the outer side of the vehicle body 23 in the transverse direction.

The strut 32 is a suspension member that has a shock absorber 33 incorporated in the upper end region, and is extendable in the up-down direction. A coil spring 34 indicated by an alternate long and short dash line in the drawing is disposed around the outer circumference of the shock absorber 33. The in-wheel motor driving unit 22 is supported by the shock absorber 33 and the coil spring 34 so as to absorb vibration in the vertical direction.

The lower arm 31 is a suspension disposed below an axis O of the in-wheel motor driving unit 22, and is connected to the in-wheel motor driving unit 22 through a ball joint (not shown) at an outer end 31a (FIG. 4) in the transverse direction, and is connected to the vehicle body 23 through a vehicle body side member (not shown) at two inner ends 31b and 31c in the transverse direction. The lower arm 31 can oscillate in the vertical direction, where the inner ends 31b and 31c in transverse direction act as proximal ends and the outer end 31a in transverse direction act as a free end.

A tie rod 35 is disposed upward of the lower arm 31. The tie rod 35 extends in the transverse direction, and the outer end thereof in the transverse direction is rotatably connected to the in-wheel motor driving unit 22. The inner end of the tie rod 35 in the transverse direction is connected to a not-illustrated steering device. The steering device advances and retracts the tie rod 35 in the transverse direction, and turns both the wheel assembly 21 and the in-wheel motor driving unit 22 about the steering axis K.

The power cable 1 is connected as follows. A power cable terminal box 36 is disposed at the upper portion of the in-wheel motor driving unit 22, and the three power wire connection portions 25 are disposed in the power cable terminal box 36, where the power wire connection portions 25 are connected to internal wiring (not shown) of respective phases of the electric motor 28. The motor side ends of the power cables 1 are connected to the power wire connection portions 25, respectively.

The ends of the three power cables 1 in the vehicle body side are collectively clamped by a clamp member 38 disposed in the vehicle body 23 through a bracket 37, and an end portion beyond the clamped portion is connected to a motor power supply (not shown) on the vehicle body 23. The clamp member 38 is, for example, positioned above the axis O of the in-wheel motor driving unit 22 so as to be adjacent to the inner side, in the transverse direction, of the lower end of the wheel housing 23a.

The position of the motor side end of the power cable 1, that is, the position of the power wire connection portion 25 of the in-wheel motor driving unit 22 is changed due to the rotation of the in-wheel motor driving unit 22 about the steering axis K in the time of steering. The position of the motor side end of the power cable 1 is changed by the suspension unit 24 absorbing the upward-downward movement of the in-wheel motor driving unit 22.

The position of the end of each power cable 1 in the motor side is repeatedly changed by the operation due to steering and the vertical movement of the in-wheel motor driving unit 22. Where the power cable 1 according to the above-described embodiment is used, or a power cable selected in the selection method for an in-wheel motor power cable according to the above-described embodiment is used, failure such as breakage of a cable in a long term operation can be avoided.

Although the embodiments for carrying out the present invention have been described above on the basis of the embodiments, the embodiments disclosed herein are illustrative in all aspects and not restrictive. The scope of the present invention is indicated by the claims, rather than by the above description, and is intended to include any modifications within the scope and meaning equivalent to the claims.

REFERENCE NUMERALS

1 . . . power cable
2 . . . conductor portion
3 . . . insulator
4 . . . shield wire
5 . . . sheath
6 . . . wire
7 . . . assembled strand

What is claimed is:
1. An in-wheel motor power cable through which power is supplied to an in-wheel motor, the power cable comprising:
 a conductor portion;
 an insulator configured to cover an outer circumference of the conductor portion;
 a hollow shield wire configured to cover an outer circumference of the insulator;
 and a sheath configured to cover an outer circumference of the shield wire, wherein the conductor portion consists of a composite strand that is a strand of a plurality of insulating-layer-free wire strands each of which is a strand of a plurality of filaments, the filaments are tin-plated soft copper wires, the insulator is a soft fluororesin, and the shield wire is a braid copper-foiled-yarn cable.

2. The in-wheel motor power cable as claimed in claim 1, wherein the composite strand is a double layered composite strand that includes an inner composite strand and an outer composite strand disposed around the outer circumference of the inner composite strand, wherein the inner composite strand is a strand of a part of the wire strands, and the outer composite strand is a strand of the other part of the wire strands.

3. The in-wheel motor power cable as claimed in claim 1, wherein the sheath is a soft fluororesin or polyester elastomer.

4. A wiring structure of an in-wheel motor power cable, comprising:

an in-wheel motor driving unit that is disposed in a wheel and drives the wheel;

a suspension unit that connects the in-wheel motor driving unit to a vehicle body in a manner capable of absorbing vertical vibration; and a bendable power cable one end of which is connected to a power wire connection portion disposed in the in-wheel motor driving unit, and the other end of which extends to the vehicle body to supply power from the vehicle body to the in-wheel motor driving unit, wherein the power cable is an in-wheel motor power cable as claimed in claim 1.

5. The wiring structure of an in-wheel motor power cable as claimed in claim 4, wherein the suspension unit connects the in-wheel motor driving unit to the vehicle body such that the in-wheel motor driving unit is steerable about a steering axis extending in a vertical direction.

6. An in-wheel motor power cable through which power is supplied to an in-wheel motor, the power cable comprising:

a conductor portion;

an insulator configured to cover an outer circumference of the conductor portion;

a hollow shield wire configured to cover an outer circumference of the insulator;

and a sheath configured to cover an outer circumference of the shield wire, wherein the conductor portion consists of a tensile member and a composite strand, where the composite strand is a strand of a plurality of insulating-layer-free wire strands each of which is a strand of a plurality of filaments, and the tensile member is disposed in the center of the conductor portion and bears a tensile force that acts on the power cable, the filaments are tin-plated soft copper wires, the insulator is a soft fluororesin, and the shield wire is a braid copper-foiled-yarn cable.

7. The in-wheel motor power cable as claimed in claim 6, wherein the composite strand is a double layered composite strand that includes an inner composite strand and an outer composite strand disposed around the outer circumference of the inner composite strand, wherein the inner composite strand is a strand of a part of the wire strands, and the outer composite strand is a strand of the other part of the wire strands.

8. The in-wheel motor power cable as claimed in claim 6, wherein the sheath is a soft fluororesin or polyester elastomer.

9. A method for selecting an electric cable to be used as an in-wheel motor power cable, the method comprising selecting a power cable that is designed to satisfy all of the following requirements:

the power cable includes a conductor portion, an insulator configured to cover an outer circumference of the conductor portion, a hollow shield wire configured to cover an outer circumference of the insulator, and a sheath configured to cover an outer circumference of the shield;

the conductor portion consists of a composite strand that is a strand of a plurality of insulating-layer-free wire strands each of which is a strand of a plurality of filaments;

each of the filaments is an tin-plated soft copper wire;

the insulator is a soft fluororesin; and the shield wire is a braided copper-foiled yarn cable.

* * * * *